F. R. MOORE.
BENCH CLAMP.
APPLICATION FILED MAY 24, 1918.
1,290,637.
Patented Jan. 7, 1919.
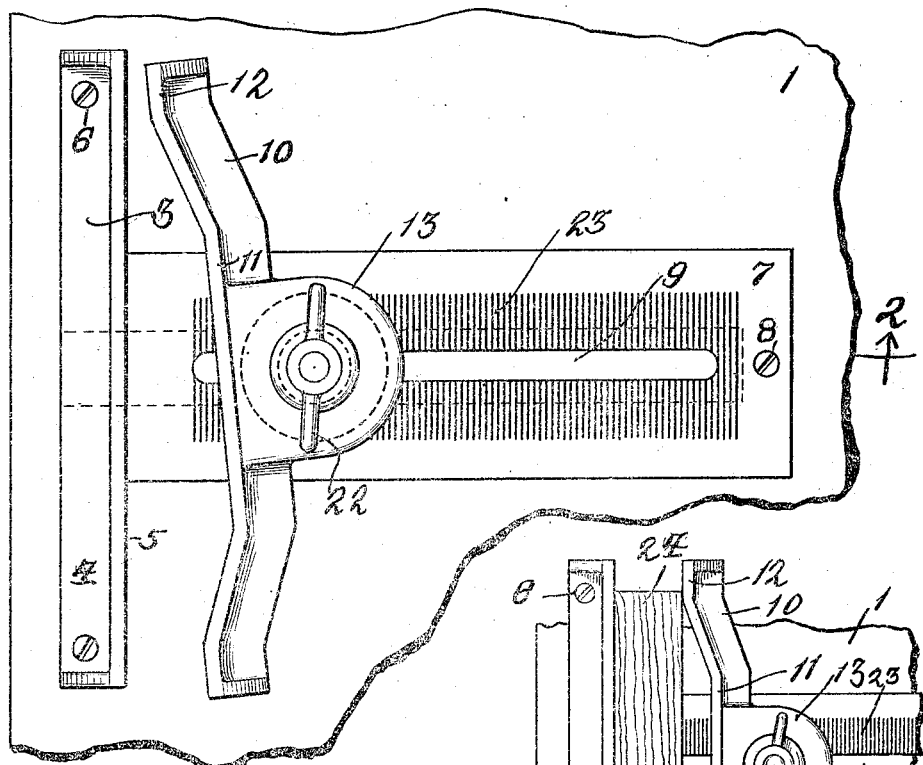
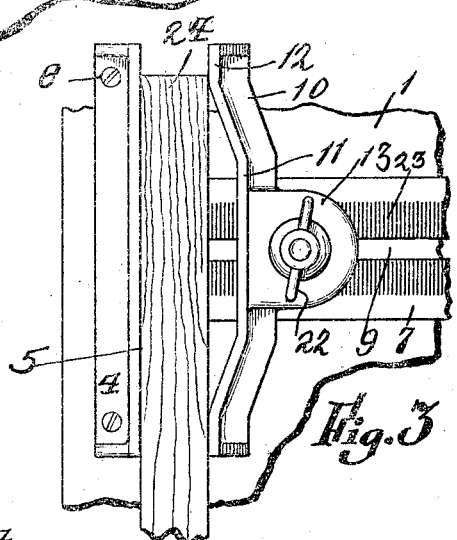
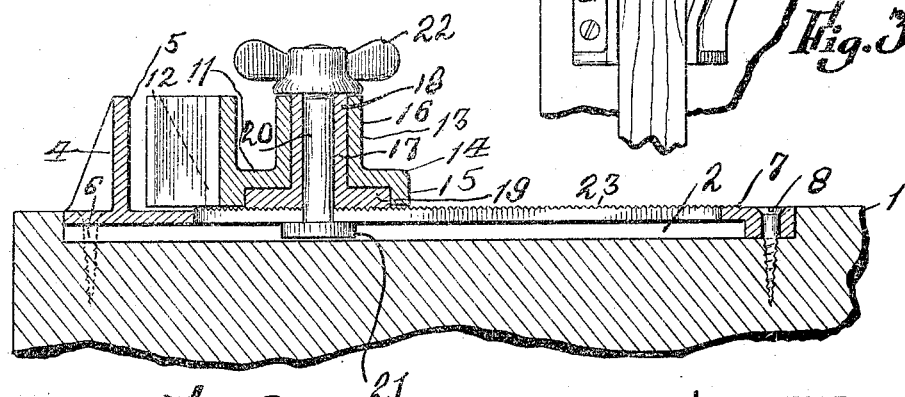
INVENTOR—
Frank R. Moore,
By C. E. Humphrey
ATTORNEY.

UNITED STATES PATENT OFFICE.

FRANK R. MOORE, OF CUYAHOGA FALLS, OHIO.

BENCH-CLAMP.

1,290,637.　　　　　Specification of Letters Patent.　　Patented Jan. 7, 1919.

Application filed May 24, 1918. Serial No. 236,394.

*To all whom it may concern:*

Be it known that I, FRANK R. MOORE, a citizen of the United States, residing at Cuyahoga Falls, in the county of Summit and State of Ohio, have invented new and useful Improvements in Bench-Clamps, of which the following is a specification.

This invention relates to improvements in bench clamps particularly designed for carpenters' use. The object of the invention is to provide an adjustable clamp for holding and clamping pieces of material of various sizes in position for the carpenter work usually done thereon. More particularly the device embodies a clamp adapted when set in a certain position to clamp successively a plurality of strips or pieces of material without changing the adjustment of the clamp, the clamping operation being accomplished by simply moving the piece of material into the clamp and which by its action clamps the piece in position for use and holds it securely until released by its removal therefrom.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a view of a device embodying the present invention showing the movable member of the clamp in its open or inoperative position.

Fig. 2 is a vertical sectional view taken on line 2 of Fig. 1, and

Fig. 3 is a view similar to Fig. 1 showing the movable clamping member in its operative position.

Referring to the drawings in detail reference numeral 1 denotes a bench or table preferably provided with a recess 2 over which is seated the fixed member 3 of the clamp which is T-shaped in outline so that the member 3 is in practice positioned immediately over the recess or slot 2 in the bench or table 1. The member 3 comprises a jaw 4 having an upwardly-projecting flange 5 the front face of which constitutes a working edge and is secured to the table or bench 1 by means of holding screws 6. Extending at right angles from the member 4 is an arm 7 held in position on the bench 1 by a screw 8. The arm 7 is positioned directly over the recess 2 and is provided with a longitudinally-extending slot 9 which is also at a right angle to the working face of the flange 5 of the jaw 4. The foregoing described element constitutes the fixed member of the clamp and is usually fixedly positioned but capable of removal from one place to another when desired. Arranged to coöperate with the fixed member 3 is a movable member comprising a jaw 10 the central portion 11 of which is inwardly bent with respect to the outer working ends 12 thereof. Formed integrally with the central portion 11 is a head 13 tubular in form and provided at its lower portion with a laterally-projecting socket 14 from which extends a downwardly-extending marginal flange 15. The flange 15 forms a cylindrical recess for a purpose to be later described. The head 13 embodies a tubular portion 16 constituting a bearing in which is mounted a clamping member 17 embodying a sleeve-like portion 18 terminating in a laterally-flanged lower portion 19. The sleeve 18 projects, under normal conditions, slightly above the upper face of the tubular portion 16 for a purpose to be later described. Positioned within the member 18 is a clamping bolt 20 having a head 21 slidable in the recess 2, the head 13, being positioned immediately above the slot 9 in the plate 7. The shank of the clamping bolt 20 is provided with a thumb nut 22, the under face of which is adapted to engage the upper face of the sleeve 18, so that when moved to its operative position it draws the head 21 of the bolt 20 against the under face of the plate 7 for frictionally locking the jaw 10 against movement longitudinally of the slot 9 or toward and away from the working face 5 of the fixed jaw 4 while permitting free rotation of the jaw 10 on the sleeve 18 as a bearing. The upper face of the plate 7 adjacent to the slot 9 is provided with serrations or teeth 23 which are engaged by the under face of the flange 19 of the sleeve 18 to increase the frictional grip of the latter on the plate under service conditions.

The device is operated by first adjusting the jaw 10 to a desired size of material to be used and is then positioned as shown in Fig. 1 and the material is pushed forward from the bottom in Fig. 1 as shown in Fig. 2 and the end of the strip of material 24 engaging the upper end 12 of the movable jaw automatically swings the opposite end of the jaw 10 into a clamping position as shown in Fig. 3. In order to adjust the device for various sizes of material the thumb screw 22 is released and the movable jaw shifted toward or away from this jaw 4 and when in position it constitutes a clamp capable of continuous use for a desired size of material, the idea being to utilize the invention for quickly and easily clamping strips of material such as boards or timbers in position without the necessity of adjusting the clamp for each piece of material held thereby but on the contrary the simple insertion of the piece of material between the jaws locks the material in position.

I claim,

1. A bench clamp comprising a T-shaped member, the head whereof constitutes the fixed jaw of the clamp, the stem of said member provided with a longitudinal slot, a bolt slidable in said slot with the head thereof below said stem, a clamping nut on the upper end of said bolt, a sleeve on said bolt between said stem and said nut arranged to be clamped against stem by said nut for holding said sleeve adjustably in position, a movable jaw having an offset median portion provided with a rearwardly-projecting head mounted on said sleeve to permit free rotation of said jaw.

2. A bench clamp comprising a T-shaped member, the head whereof constitutes the fixed jaw of the clamp, the stem of said member provided with a longitudinal slot, the surface of stem near said slot being serrated, a bolt slidable in said slot with the head thereof engaging the lower face of said stem, a sleeve on said bolt, the lower face of which engages the upper face of said stem, a clamping nut on the upper face of said bolt adapted to clamp said sleeve adjustably in position on said stem, a movable jaw having an offset intermediate portion provided with a head, said head mounted on said sleeve to permit free rotation thereof.

3. A bench clamp comprising a T-shaped member, the head whereof constitutes the fixed jaw of the clamp, the stem of said member having a longitudinal slot, a bolt slidably mounted in said slot with the head thereof below said stem, a sleeve mounted on said bolt the lower end of which is provided with an enlargement which engages the upper face of said stem, a clamping nut on the upper end of said bolt for clamping said sleeve against said stem to hold it temporarily in an adjusted position, a movable jaw having an offset median portion provided with a head rotatably mounted on said bolt the ends of said movable jaw projecting toward said fixed jaw whereby when one end of said movable jaw is engaged by an article the opposite end is swung into operative position.

In testimony whereof I have hereunto set my hand.

FRANK R. MOORE.

Copies of this patent may be obtained for five cents each, by addressing the "Commissioner of Patents, Washington, D. C."